United States Patent
Howes et al.

(10) Patent No.: US 8,813,439 B2
(45) Date of Patent: Aug. 26, 2014

(54) METHOD AND APPARATUS FOR MAKING INSULATING TRANSLUCENT PANEL ASSEMBLIES

(76) Inventors: Stephen E. Howes, Grand Bahama (BS); Gerhard Reichert, New Philadelphia, OH (US)

( * ) Notice: Subject to any disclaimer, the term of this patent is extended or adjusted under 35 U.S.C. 154(b) by 674 days.

(21) Appl. No.: 12/892,087

(22) Filed: Sep. 28, 2010

(65) Prior Publication Data
US 2011/0072758 A1 Mar. 31, 2011

Related U.S. Application Data

(60) Provisional application No. 61/246,691, filed on Sep. 29, 2009.

(51) Int. Cl.
*E06B 3/663* (2006.01)
*B29C 43/18* (2006.01)
*B29C 43/36* (2006.01)
*B29C 70/76* (2006.01)
*B29K 67/00* (2006.01)
*B29L 31/00* (2006.01)

(52) U.S. Cl.
CPC ............ *B29C 70/763* (2013.01); *B29K 2067/00* (2013.01); *B29C 43/18* (2013.01); *B29L 2031/778* (2013.01); *B29L 2031/724* (2013.01); *B29C 43/3697* (2013.01); *E06B 3/66342* (2013.01); *B29L 2031/7782* (2013.01)
USPC .......................................... 52/172; 52/786.13

(58) Field of Classification Search
CPC ............ E06B 3/66304; E06B 3/66361; E06B 3/66319; E06B 3/66352; E06B 3/66328
USPC .................. 52/172, 204.593, 786.13, 717.04; 428/595, 34
See application file for complete search history.

(56) References Cited

U.S. PATENT DOCUMENTS

| 3,543,465 | A | * | 12/1970 | Jackson | 52/716.5 |
|---|---|---|---|---|---|
| 3,733,237 | A | * | 5/1973 | Wolff | 156/468 |
| 3,758,996 | A | * | 9/1973 | Bowser | 55/385.1 |
| 4,829,157 | A | | 5/1989 | Loyd | |
| 4,831,799 | A | | 5/1989 | Glover et al. | |
| 4,994,309 | A | | 2/1991 | Reichert et al. | |
| 5,007,217 | A | | 4/1991 | Glover et al. | |
| 5,085,891 | A | | 2/1992 | Evans | |

(Continued)

FOREIGN PATENT DOCUMENTS

| JP | 2003095224 A | 4/2003 | |
|---|---|---|---|
| WO | WO 2009103511 A1 * | 8/2009 | E06B 3/663 |

OTHER PUBLICATIONS

SmartEdge. http://web.archive.org/web/20081225061935/http://www.glasslam.com/smartedge.php. Published Dec. 25, 2008.*
Glasslam NGI., Inc., Air-Tight SmartEdge, Brochure, undated.

(Continued)

*Primary Examiner* — Christine T Cajilig
(74) *Attorney, Agent, or Firm* — Wood, Herron & Evans, L.L.P.

(57) ABSTRACT

A method of making an insulating translucent panel assembly such as a window or door lite is provided. In the method, a spacer between two translucent panels of glass or plastic includes a thermo-responsive sealing material. When heat and compression are applied to the spacer, the thermo-responsive sealing material softens and fully seals the spacer to the two translucent panels. A spacer designed to be used in this method is also provided.

14 Claims, 13 Drawing Sheets

(56) References Cited

U.S. PATENT DOCUMENTS

| | | | |
|---|---|---|---|
| 5,441,779 A * | 8/1995 | Lafond | 428/34 |
| 5,496,609 A * | 3/1996 | Michelstein | 428/71 |
| 5,640,815 A * | 6/1997 | Chinzi | 52/172 |
| 5,773,135 A | 6/1998 | Lafond | |
| 5,834,124 A | 11/1998 | Pease, III et al. | |
| 5,948,195 A | 9/1999 | Thomas | |
| 6,266,940 B1 | 7/2001 | Reichert | |
| 6,329,030 B1 * | 12/2001 | Lafond | 428/34 |
| 6,470,561 B1 * | 10/2002 | Misera et al. | 29/527.1 |
| 6,606,837 B2 * | 8/2003 | Trpkovski et al. | 52/745.19 |
| 7,347,909 B2 | 3/2008 | Reichert | |
| 7,571,583 B2 | 8/2009 | Winfield | |
| 7,698,863 B2 | 4/2010 | Forsland et al. | |
| 7,716,885 B2 * | 5/2010 | Reichert | 52/204.61 |
| 7,743,584 B2 * | 6/2010 | Reichert et al. | 52/745.15 |
| 7,875,329 B2 * | 1/2011 | Kawasaki et al. | 428/34 |
| 8,230,661 B2 * | 7/2012 | Baratuci et al. | 52/786.13 |
| 8,530,010 B2 * | 9/2013 | Lenhardt | 428/34 |
| 2007/0003717 A1 * | 1/2007 | Kawasaki et al. | 428/34 |
| 2008/0115877 A1 * | 5/2008 | Reichert | 156/107 |
| 2009/0120035 A1 * | 5/2009 | Trpkovski | 52/786.13 |
| 2009/0304956 A1 * | 12/2009 | Probster et al. | 428/34 |
| 2012/0295043 A1 * | 11/2012 | Ensinger | 428/34 |
| 2013/0318892 A1 * | 12/2013 | Grommesh et al. | 52/171.3 |

OTHER PUBLICATIONS

Glasslam NGI., Inc., Air-Tight(TM) Spacer Products, Brochure, undated.

U.S. Patent and Trademark Office, International Search Report and Written Opinion in PCT Application Serial No. PCT/US10/50531, Nov. 29, 2010.

U.S. Patent and Trademark Office, International Preliminary Report on Patentability in PCT Application Serial No. PCT/US10/50531, Oct. 19, 2011.

UK Intellectual Property Office, Examination Report in UK Application No. 1207135.3, Apr. 15, 2014.

* cited by examiner

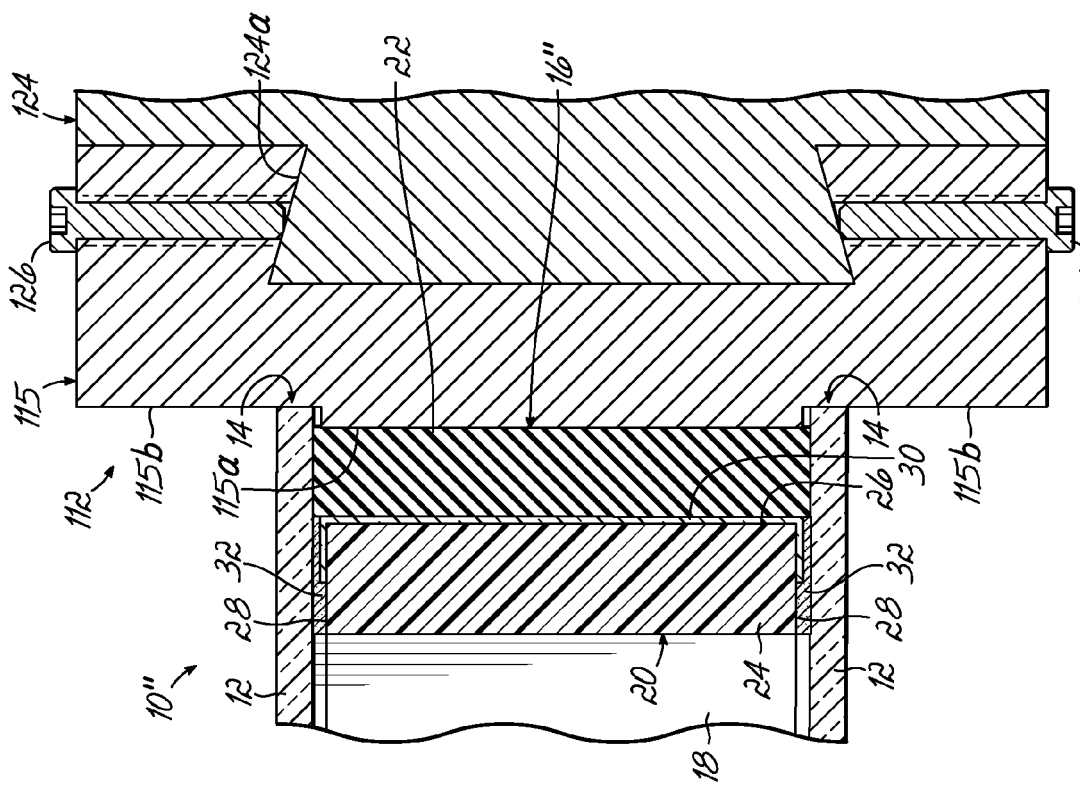
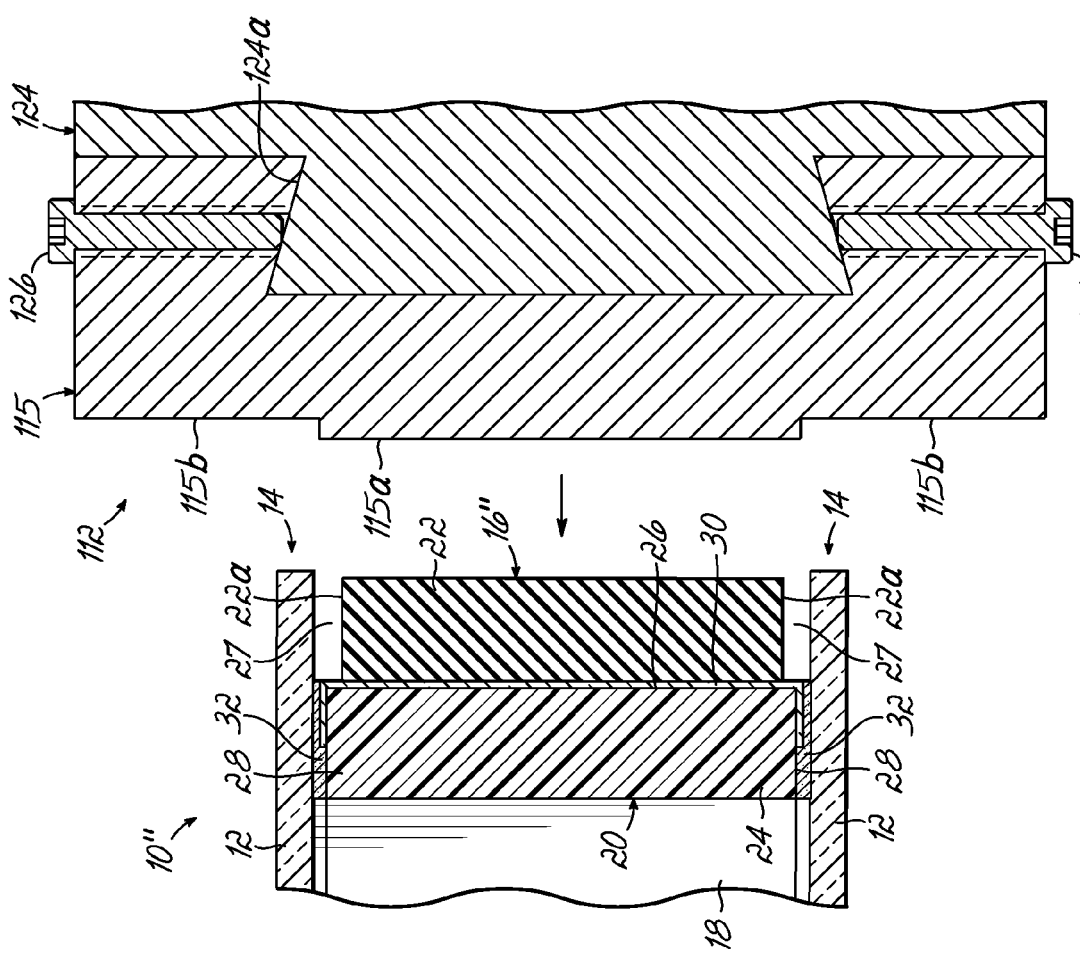
FIG. 11
FIG. 12

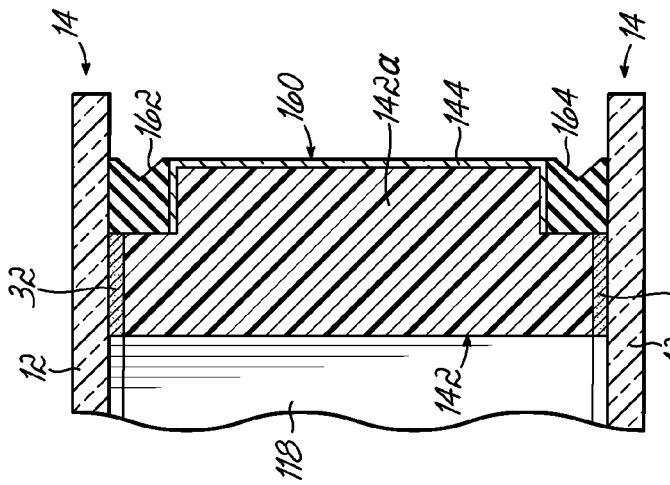
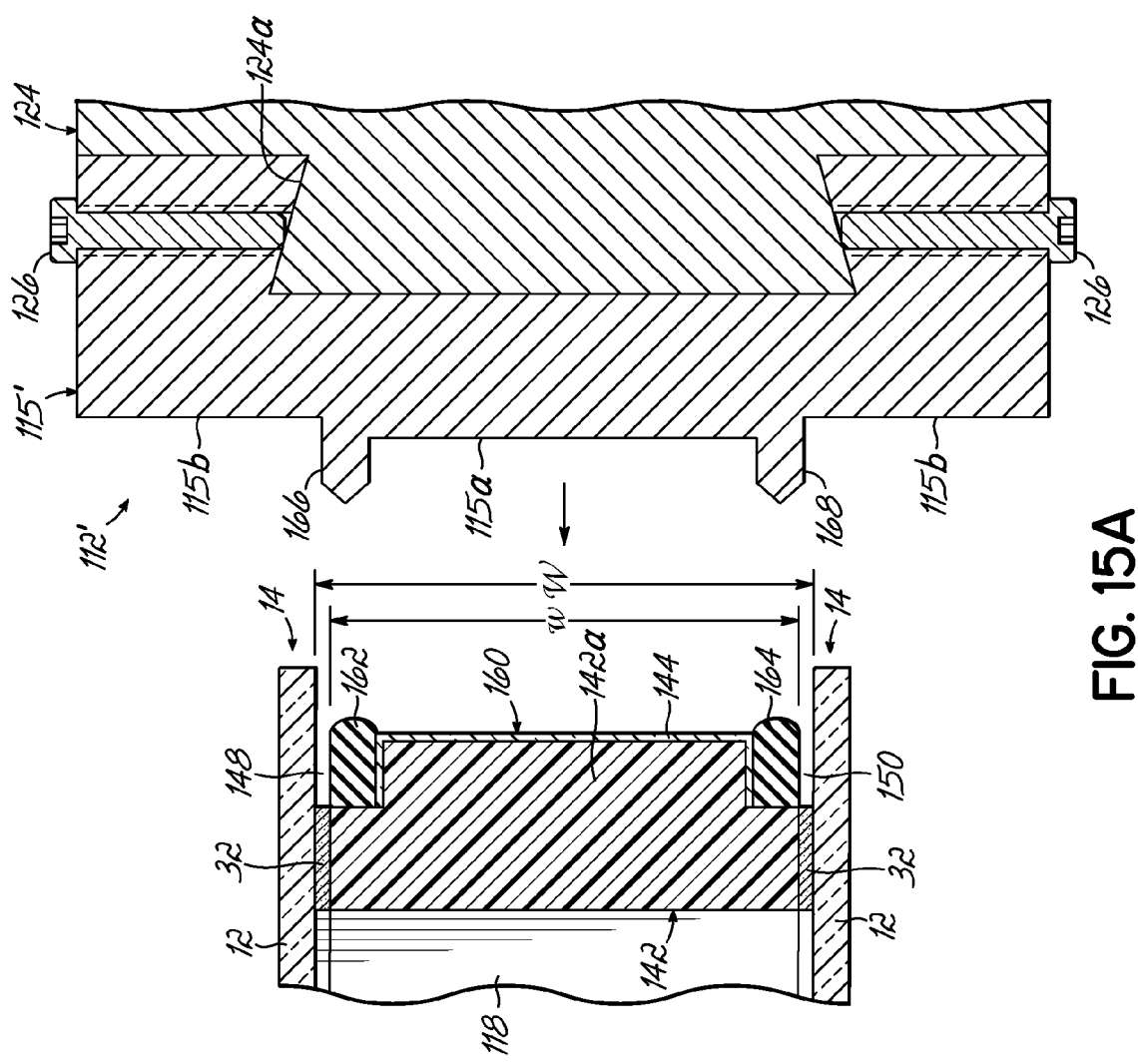
FIG. 15A
FIG. 15B

METHOD AND APPARATUS FOR MAKING INSULATING TRANSLUCENT PANEL ASSEMBLIES

CROSS-REFERENCE TO RELATED APPLICATION

This application claims the priority of U.S. Provisional Patent Application Ser. No. 61/246,691, filed on Sep. 29, 2009, the disclosure of which is incorporated by reference herein.

TECHNICAL FIELD

This application relates to methods of making insulating translucent panel assemblies with insulating spaces located between translucent panels of material such as glass.

BACKGROUND

Insulating translucent panel assemblies, such as windows and door lites, typically consist of at least two parallel panels of glass or plastic spaced apart by a spacer sealed around the periphery of the panels of glass or plastic. A sealed space of air or insert gas is formed within the insulating translucent panel assembly and helps maintain the temperature difference between the interior side of the barrier and the exterior side of the barrier. Developments in the field of insulating translucent barriers for the past twenty years have included the spacers used to hold the parallel panels of glass or plastic in spaced apart relation.

Early spacers were formed from hollow metal bars filled with a desiccant material that would keep the sealed space within the insulating translucent barrier dry. The high thermal conductivity between panels of glass or plastic led to misting or fogging problems in extreme weather conditions, and this led to improved spacers. Some spacers combined a desiccant foam material with a moisture barrier to remove substantially all thermal conduction between the panels of glass or plastic. One problem was that these spacers required secondary sealant to be applied to the periphery of the spacer for the insulating translucent barrier to be effectively sealed. Spacers formed of simple desiccant-filled butyl material that could be pressed or heated to the necessary spacer shape were developed to simplify the manufacturing process, but these spacers have only one level of seal between the sealed space and the outside atmosphere. It would therefore be desirable to improve on conventional insulating translucent panel assemblies and their methods of manufacture.

SUMMARY

In one illustrative embodiment, the current invention provides a method of making an insulating translucent panel assembly. The method includes positioning first and second translucent panels in at least substantially parallel and spaced apart relation with each other. A spacer is fixed between the first and second translucent panels along the periphery of each panel. This spacer is comprised of a barrier and a thermo-responsive sealing material. Heat and compression forces are delivered to the spacer using a heated compression device to soften the thermo-responsive sealing material. The softening may include partial liquefication of the sealing material. Delivering heat and compression seals the spacer to the first and second translucent panels by spreading the sealing material into a sealing condition between the panels, forming a sealed space between the translucent panels.

In one aspect of the method the heated compression device further comprises a heated, static bar element and delivering heat and compression forces to the spacer comprises sliding the heated, static bar element along the spacer and in thermal contact with the thermo-responsive sealing material. This bar element, for example, may be an elongate bar of thermally conductive metal, such as brass, having a stepped profile for contact with the sealing material. The heated compression device may further comprise a handle thermally isolated from the heated element. The handle may be gripped by a user and pushed manually along the spacer with the heated element in thermal contact with the thermo-responsive sealing material. The thermal contact may be direct contact if the thermo-responsive sealing material does not stick to the heated element during the sealing process or may involve the use of a release substrate on the sealing material to provide a nonstick contact surface for the heated element. Alternatively, the release substrate may be applied to the sealing material during the manufacturing process and left in place while fixing the spacer between the panels, but then removed prior to applying the heat and compression. In another alternative embodiment, the heated compression device may further comprise a heated roller and moving the heated compression device includes rolling the heated roller along the thermo-responsive sealing material to soften the thermo-responsive sealing material and spread it into a sealing condition between the first and second translucent panels. In another aspect, moving the heated compression device may include pushing the heated compression device automatically along the spacer and along the periphery of the translucent panels.

In another embodiment of the invention, a heated compression device is provided for delivering heat and compression forces to a spacer between two translucent panels. The device comprises a support structure and at least one thermally conductive element attached to the support structure. The thermally conductive element is adapted to be heated to a high temperature and applied to the spacer for directing heat and compression to the thermo-responsive sealing material associated therewith. An electrically operable heater is in thermal contact with the thermally conductive element. A handle is coupled to the support structure for allowing a user to apply the thermally conductive element to the spacer. The handle is thermally isolated from the thermally conductive element.

Other features of the heated compression device may include forming the thermally conductive element as an elongate bar made of thermally conductive material, such as brass, copper, aluminum or other metals, alloys or composites. The elongate bar may include an outwardly facing working surface with a first portion that projects outwardly relative to an adjacent second portion of the working surface. The first portion is adapted to engage the spacer and, more preferably, the thermo-responsive sealing material such as hot melt adhesive, and apply heat and compression to spread the material into sealing engagement with both translucent panels. The projecting portion or first portion may be a central stepped portion of the working surface. In other embodiments, projecting portions may be formed along opposite edges of the working surface to engage sealing material associated with the spacer and located respectively adjacent the translucent panels. In some embodiments, the thermally conductive element may further comprise a roller and the roller may include a working surface such as in one of the configurations described herein. In addition, the working surface of the roller may be curved not only around the axis of rotation associated with the roller, but also in a direction parallel to the axis of rotation. In another embodiment, the working surface of the roller may include one or more cylindrical outer surface portions, or outer surface portions of other shapes. A pair of guides may be associated with the heated compression device. These guides may be separate from the thermally conductive element, or integrated into the thermally conductive element. The guides are positioned for engaging the translucent panels, such as along peripheral edges of the panels, and guiding the thermally conductive element as the thermally conductive element moves along the spacer. The electrically operable heater is controlled to operate at a temperature of at least 350° F. and, may operate successfully at much higher temperatures such as above 500° F. and even above 1000° F. using certain hot melt adhesives, such as butyl-based hot melt adhesives.

In another embodiment of the invention, a spacer is provided for attaching first and second translucent panels together to form an insulating translucent panel assembly with a sealed spaced between the translucent panels. The spacer comprises a barrier layer adapted to dry the sealed space between the translucent panels and a thermo-responsive sealing material co-molded such as by being co-extruded with the barrier layer. The thermo-responsive sealing material is capable of being softened to seal the barrier layer to the translucent panels when heat and compression are applied to the thermo-responsive sealing material. The barrier layer may further comprise a desiccant-filled foam material including peripheral and side surfaces. The spacer may further include a moisture barrier attached to the peripheral and side surfaces and between the desiccant-filled foam material and the thermo-responsive sealing material. A pressure sensitive adhesive may be applied to opposite side surfaces of the barrier layer and adapted to attach the translucent panels to the spacer. A release substrate may be applied to the thermo-responsive sealing material and adapted to cover the thermo-responsive sealing material during the manufacturing process and, as an additional option, during application of heat and compression to the outer or peripheral portion thereof. The thermo-responsive sealing material is preferably an adhesive and, more preferably, a hot melt adhesive such as a butyl-based hot melt adhesive.

BRIEF DESCRIPTION OF THE DRAWINGS

FIG. 11 is a cross sectional, partially fragmented view illustrating the tool of FIG. 8 just before applying heat and compression to the spacer of FIG. 10.

FIG. 12 is a cross sectional, partially fragmented view similar to FIG. 11, but illustrating heat and compression being applied to the spacer to soften and spread the thermo-responsive sealing material into sealing engagement with the translucent panels.

FIG. 15A is a cross sectional, partially fragmented view of another alternative embodiment of a heated compression tool just prior to its use on another alternative spacer.

FIG. 15B is a cross sectional view of the translucent panel assembly after the spacer of FIG. 15A has been sealed using the tool shown in FIG. 15A.

DETAILED DESCRIPTION OF THE
ILLUSTRATIVE EMBODIMENTS

Figure 1:
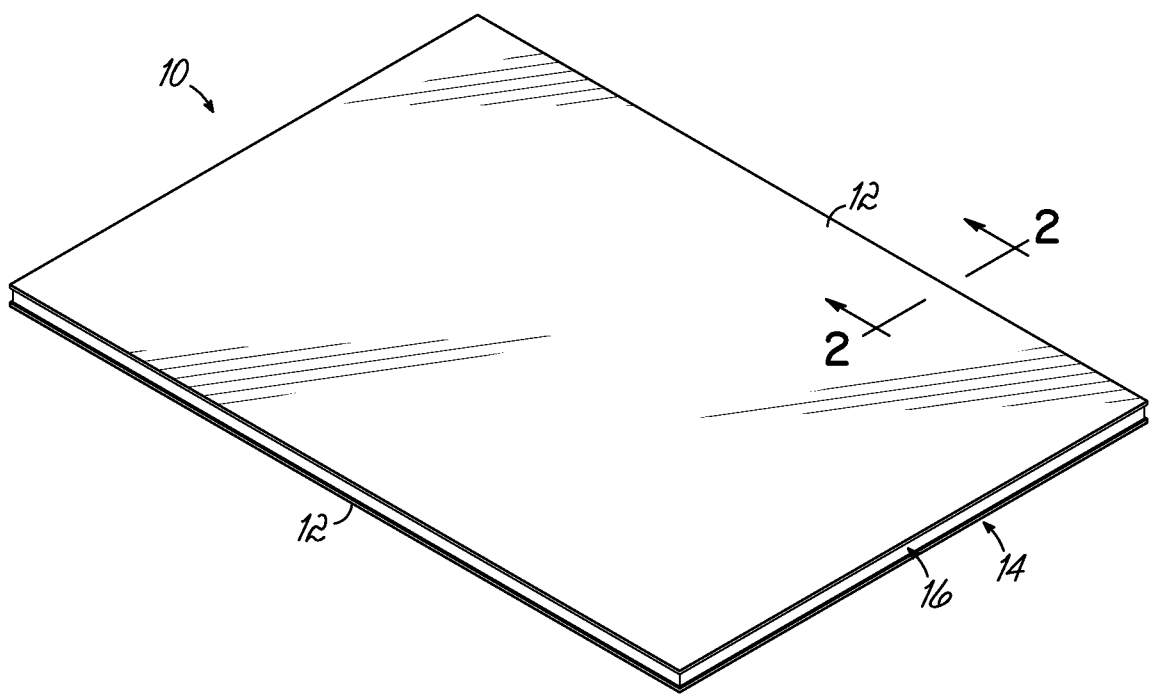
FIG. 1 is a perspective view of an insulating translucent panel assembly.
Figure 2:
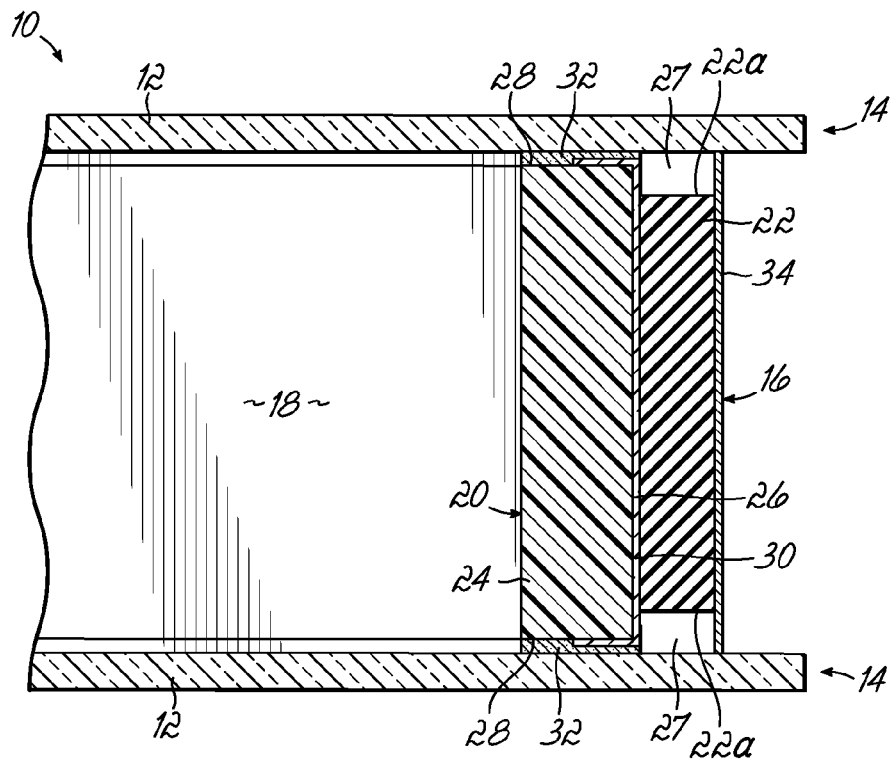
FIG. 2 is a cross-sectional view of the insulating translucent panel assembly taken along line 2-2 of FIG. 1.

One embodiment of an insulating translucent panel assembly 10 is illustrated in FIGS. 1 and 2. The insulating translucent panel assembly 10 includes first and second translucent panels 12 positioned in a parallel and spaced-apart relation to each other. The translucent panels 12 can be conventional sheets of glass or plastic as typically used in residential or commercial windows and door lites. Although the translucent panels 12 shown in FIG. 1 are rectangular, one skilled in the art will realize the shape of the translucent panels 12 can be modified without departing from the inventive scope. Also, more than two panels may be used.

The translucent panels comprise a periphery 14 or outer edges to be sealed together. The insulating translucent panel assembly 10 includes a spacer 16 applied to the periphery 14 of the translucent panels 12. The translucent panels 12 and spacer 16 then form a sealed space 18 of air or inert gas between the translucent panels 12. This sealed space 18 improves the thermal transfer properties of the insulating translucent panel assembly 10.

A spacer 16 designed to attach two translucent panels 12 together is illustrated in detail by FIG. 2. The spacer 16 comprises a barrier 20 and a solid thermo-responsive sealing material 22. The barrier 20 maintains dryness in the sealed space 18 and isolates the sealed space 18 from the outside atmosphere. The barrier 20 comprises a desiccant-filled foam material 24 with a peripheral surface 26 and side surfaces 28. The desiccant-filled foam material 24 can be formed from extruded, foamed EPDM rubber or silicone, and the desiccant added to the foam will absorb moisture which forms in the sealed space 18. The barrier 20 further includes a moisture barrier 30 that is attached to the peripheral surface 26 and side surfaces 28. One example of a moisture barrier 30 is a metalized PET film that attaches to the desiccant-filled foam material 24 using conventional adhesive after the foam material 24 is cured with heat. Alternatively, and in accordance with an alternative aspect of the invention, the three components may be co-extruded or otherwise co-molded with the moisture barrier 30 being inserted into a mold and layers 22, 24 being molded onto opposite sides of moisture barrier 30. The barrier 20 also comprises a pressure-sensitive adhesive 32 covering the side surfaces 28 of the foam material 24 and moisture barrier 30. One example of the pressure-sensitive adhesive 32 would be an acrylic adhesive. The pressure-sensitive adhesive 32 engages the translucent panels 12 to provide a first level of seal between the spacer 16 and the translucent panels 12 and to attach the panels 12 together. The thickness of the pressure sensitive adhesive layers shown herein is exaggerated for illustration purposes. Although various thicknesses may be used, depending on the adhesive type for example, a typical thickness is less than 0.010" and even less than 0.005". The moisture barrier 30 is also typically a very thin film layer or laminate.

The solid thermo-responsive sealing material 22 is a strip of material applied to the peripheral side of the barrier 20. When heat and compression are applied to the solid thermo-responsive sealing material 22, the solid thermo-responsive sealing material 22 softens and seals the barrier 20 to each translucent panel 12. For example, the solid thermo-responsive sealing material 22 may be a hot-melt butyl adhesive. The solid thermo-responsive sealing material 22 may include a release substrate 34 made of paper or plastic material. The release substrate 34 covers and protects the solid thermo-responsive sealing material 22. For example, this can be advantageous during manufacture of the assembly 10 and, as an additional option, while heat and compression are applied. Before or after the solid thermo-responsive sealing material 22 is heated and softened, depending on the application needs, the release substrate 34 is designed to be removed by peeling the release substrate 34 from the spacer 16 or a similar action. The release substrate 34 is removed for aesthetic and installation purposes. Alternatively, the release substrate 34 can be left on during installation of the insulating translucent panel assembly 10, for example, in a building structure. As another alternative described below, the release substrate may be eliminated entirely.

Figure 2A:
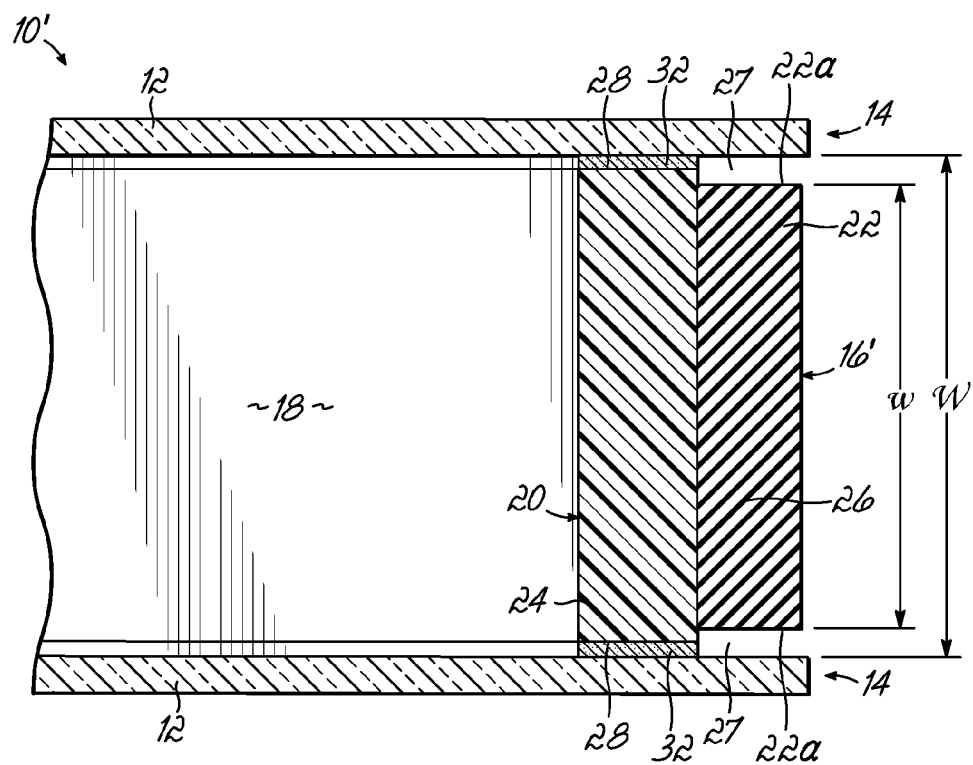
FIG. 2A is a cross sectional view similar to FIG. 2, but illustrating an alternative embodiment of a spacer.

FIG. 2A illustrates a panel assembly 10' including a spacer 16' that is modified relative to the spacer 16 shown in FIG. 2. In particular, in this embodiment, the spacer 16' does not include the moisture barrier layer 30 and also does not include the release substrate 34. If the sealing material 22 provides adequate moisture or vapor barrier properties, the additional moisture barrier film 30 is not necessary. In addition, as discussed herein, the release substrate 34 is not necessary so long as the device used to supply heat and compression to the thermo-responsive sealing material 22 does not stick to that material in significant amounts. In an additional and alternative aspect of the invention, spacer 16' may be manufactured using a co-molding and, more specifically, co-extrusion process. In this regard, the foam barrier layer 24, containing a suitable desiccant for example, may be co-extruded with the sealing material 22 in a side-by-side relationship as shown in the cross section of FIG. 2A. Alternatively, the intervening moisture barrier layer 30 may be provided as an insert in the molding process and the co-molding or co-extrusion may take place with layers 22 and 24 extruded onto opposite sides of the moisture barrier layer 30. Immediately after the molding or extrusion process, the molded composite comprised at least of layers 22, 24 is preferably chilled in a water bath so as to solidify or freeze the layers 22, 24 in the desired form as shown. At this point, the additional adhesive layers 32 may be applied to opposite side surfaces of the foam barrier layer 24. With this construction, the width w of the thermo-responsive sealing material layer 22 is less than the width W between the respective, spaced apart panels 12. The width w of the thermo-responsive sealing material layer 22 is also less than the overall or combined width W of the foam layer 24 and adhesive layers 32 as also shown in FIG. 2A. In still other embodiments, the width of the sealing material layer 22 is less than the width of the barrier layer 24. This relationship also carries through the other embodiments of spacers illustrated and described herein. This unique width relationship allows the solid and preapplied thermo-responsive sealing material layer 22 to be heated, softened and spread outwardly into spaces or voids 27 that initially exist between the edges 22a of the thermo-responsive sealing material 22 and the inside surfaces of the panels 12.

Figure 3:
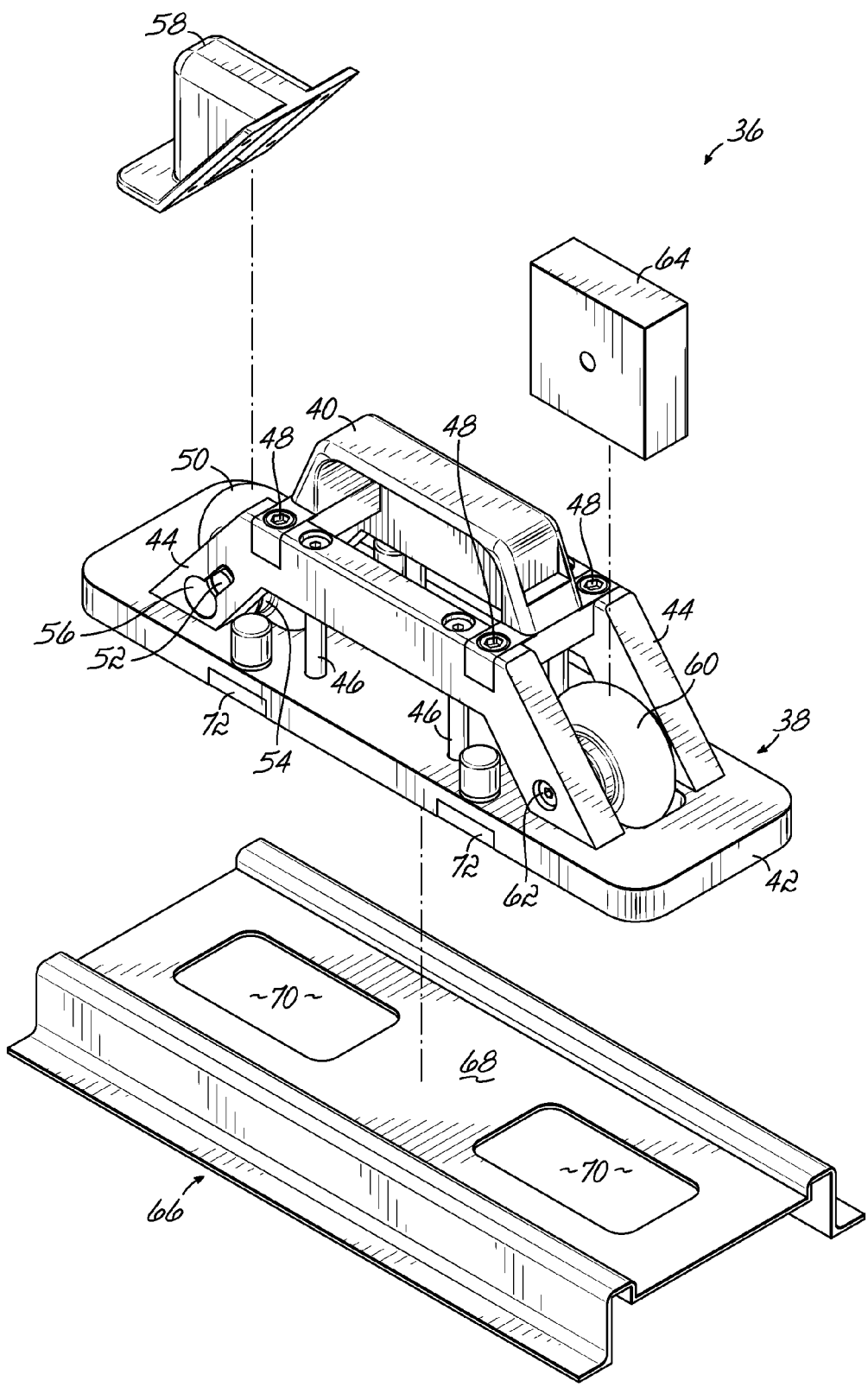
FIG. 3 is a partially exploded view of a heated compression device or tool for delivering heat and compression forces to the spacer.
Figure 4:
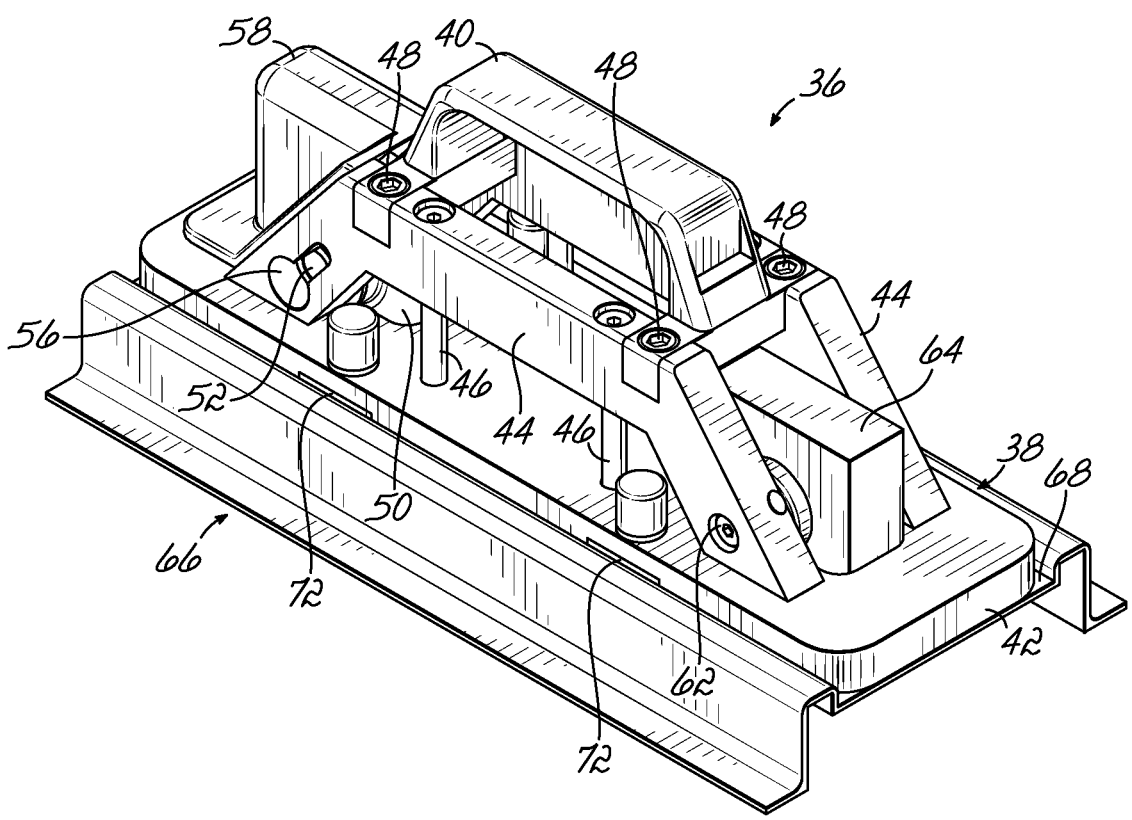
FIG. 4 is a perspective view of the device of FIG. 3 in assembled form.

FIGS. 3 and 4 illustrate a heated compression device 36 for delivering heat and compression forces to the spacer 16. The heated compression device 36 is designed to move along the spacer 16 to soften the solid thermo-responsive sealing material 22. The softening process may include partial liquefication of the sealing material 22. The heated compression device 36 comprises a body 38 and a handle 40. The body 38 includes a deck panel 42 and a pair of axle supports 44 projecting upwards from the deck panel 42. The axle supports 44 are attached to the deck panel 42 with bolts 46 or other fasteners. The handle 40 is also attached to the axle supports 44 with screws 48 as shown in FIG. 3. The heated compression device 36 further comprises a heated roller 50. The heated roller 50 is adapted to be heated to a high temperature sufficient to soften and spread the material 22, such as above 350 degrees Fahrenheit. The heated roller 50 projects beyond the deck panel 42 so that the heated roller 50 can apply heat and compression to a spacer 16. The heated roller 50 is mounted on a bronze bushing 52 attached to the axle supports 44 so that the heated roller 50 can rotate freely with respect to the body 38. Heater washers 54 are installed between the heated roller 50 and the body 38. The axle supports 44 include a bore 56 in communication with the bronze bushing 52, and this bore 56 is adapted to allow access to the bronze bushing 52 for warming the heated roller 50 to high temperatures. The heated compression device 36 also includes a heated roller guard 58 attached to the axle supports 44. The heated roller guard 58 inhibits heat transfer from the heated roller 50 to the handle 40 and surrounding area, thus preventing hand burns. The heated compression device 36 also comprises a measuring wheel 60 attached to the axle supports 44 on an axle bolt 62. The measuring wheel 60 also rotates freely with respect to the body 38 and projects beyond the deck panel 42 to guide the heated compression device 36 as it moves along the spacer 16. A measuring wheel cover 64 is also attached to the axle supports 44 to protect the user's hand on the handle 40 from contacting the measuring wheel 60.

Figure 5:
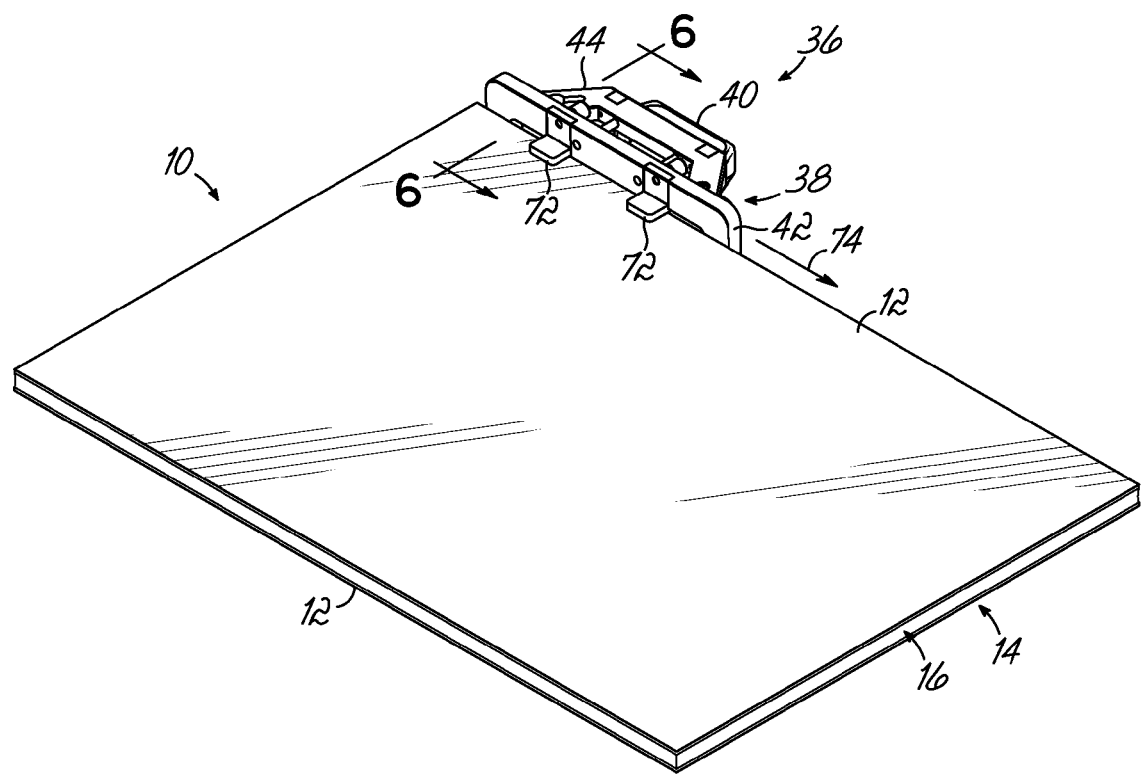
FIG. 5 is a perspective view of the device of FIG. 3 applying heat and compression forces to the spacer of an insulating translucent panel assembly.

A stand 66 is adapted to hold the heated compression device 36 when not in use. The stand 66 includes a raised holding surface 68 with apertures 70 through the holding surface 68. The holding surface 68 engages the deck panel 42 so that the heated roller 50 and the measuring wheel 60 sit in the apertures 70. As illustrated in FIG. 5, the heated compression device 36 may also comprise a pair of guide rails 72. The guide rails 72 are attached to the deck panel 42 and are adapted to engage the outer edges of translucent panels 12 of the insulating translucent panel assembly 10. The guide rails 72 are adjustable in width to accommodate various thicknesses of insulating translucent panel assemblies 10.

Figure 8:
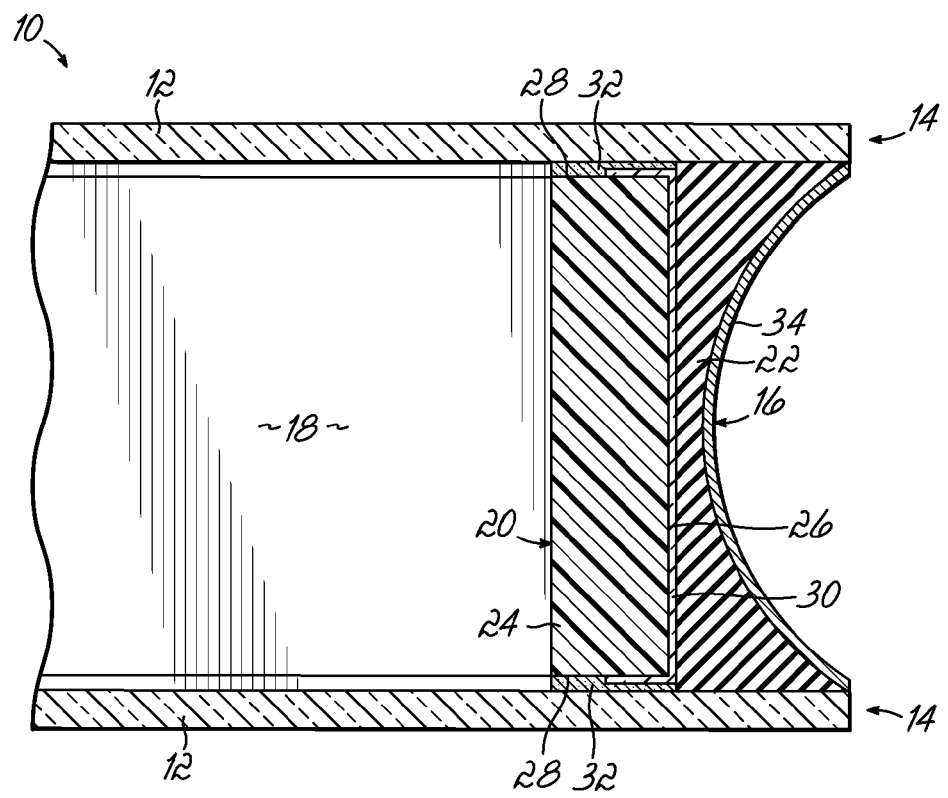
FIG. 8 is a cross-sectional view of the insulating translucent barrier similar to FIG. 2, but shown after heat and compression are applied to the spacer.
Figure 6:
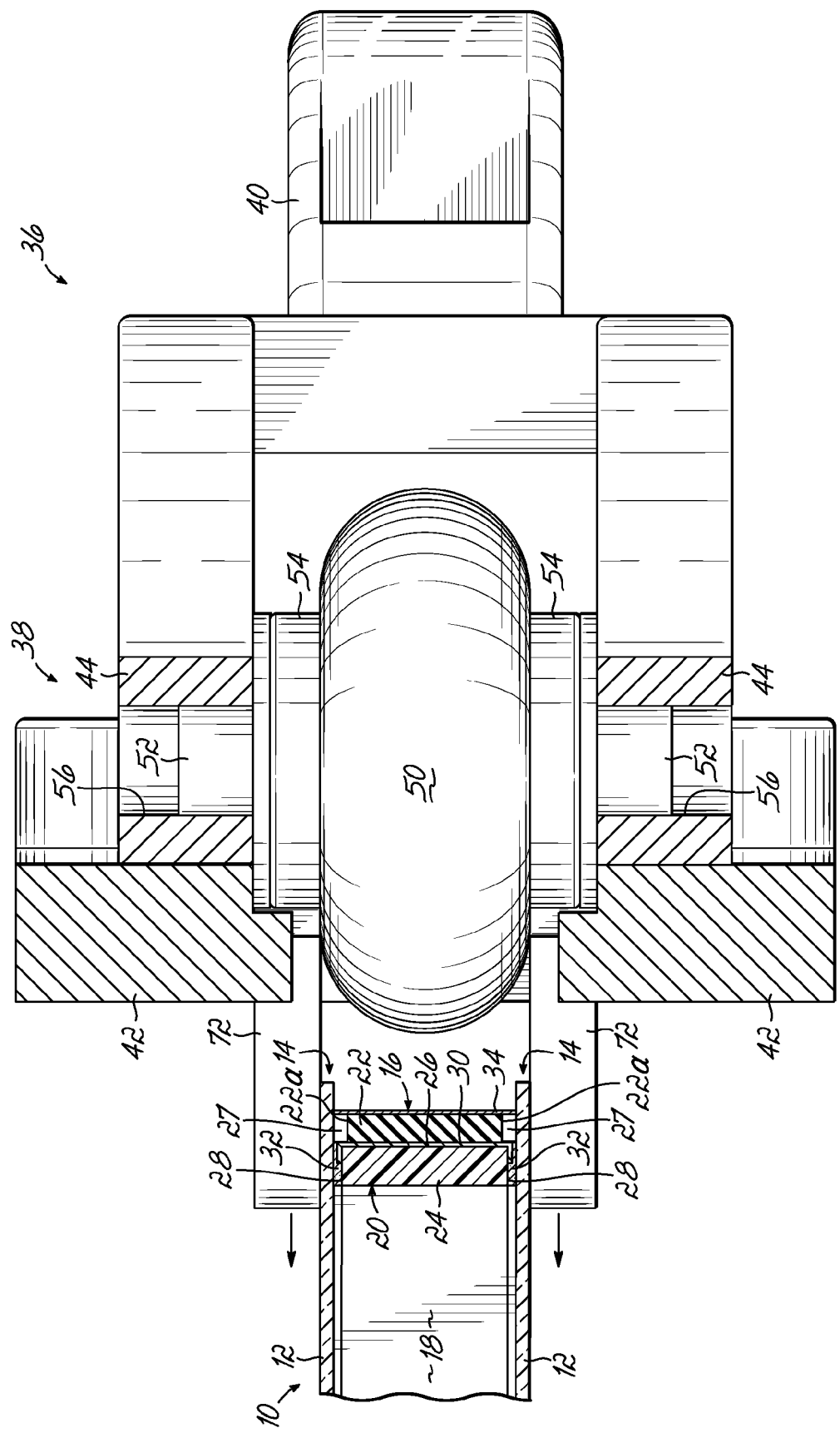
FIG. 6 is a partial cross-sectional view taken along line 6-6 of FIG. 5, before heat and compression are applied to the spacer.
Figure 7:
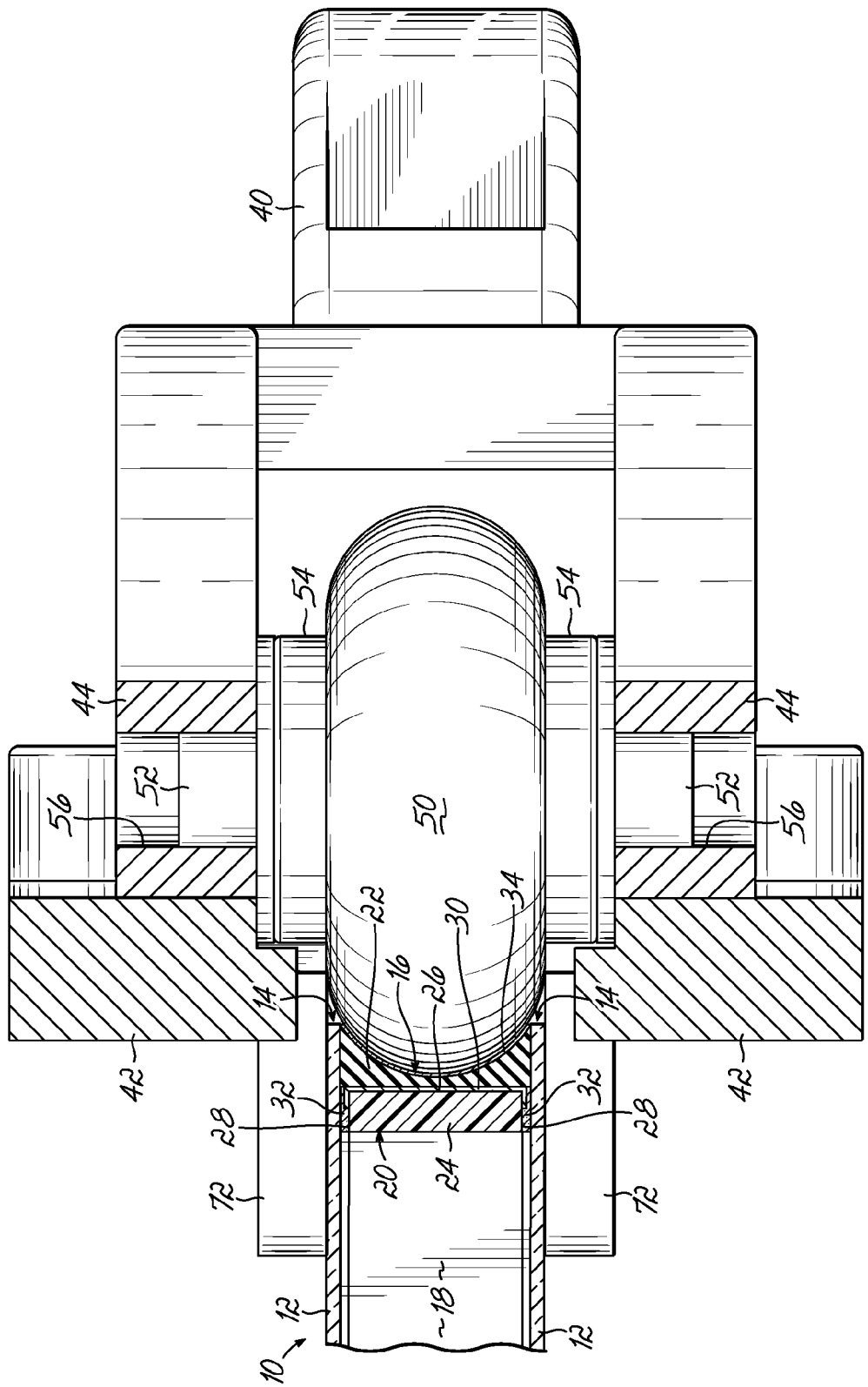
FIG. 7 is a partial cross-sectional view similar to FIG. 6, but illustrated with heat and compression being applied to the spacer.

The heated compression device 36 seals an insulating translucent panel assembly 10 as illustrated in FIGS. 5-7. The guide rails 72 are lined up with translucent panels 12 as shown in FIG. 5. The cross-sectional views of FIGS. 6 and 7 show the heated compression device 36 engaging the spacer 16 just before and just after the application of heat and compression, respectively. The release substrate 34 helps prevent the heated compression device 36 from picking up any of the solid thermo-responsive sealing material 22. In one aspect a user holds the heated compression device 36 by the handle 40 and manually pushes or rolls the heated compression device 36 along the spacer 16 and periphery 14 of translucent panels 12 in the direction indicated by arrow 74. In another aspect the heated compression device 36 is attached to a manufacturing table (not shown), and an automated device on the manufacturing table automatically moves or rolls the heated compression device 36 along the spacer 16. Regardless of whether the heated compression device 36 is moved manually or automatically, the solid thermo-responsive sealing material 22 softens and spreads out as shown in FIGS. 7 and 8. The thermo-responsive sealing material 22 now becomes a second seal between the spacer 16 and the translucent panels 12.

Figure 9:
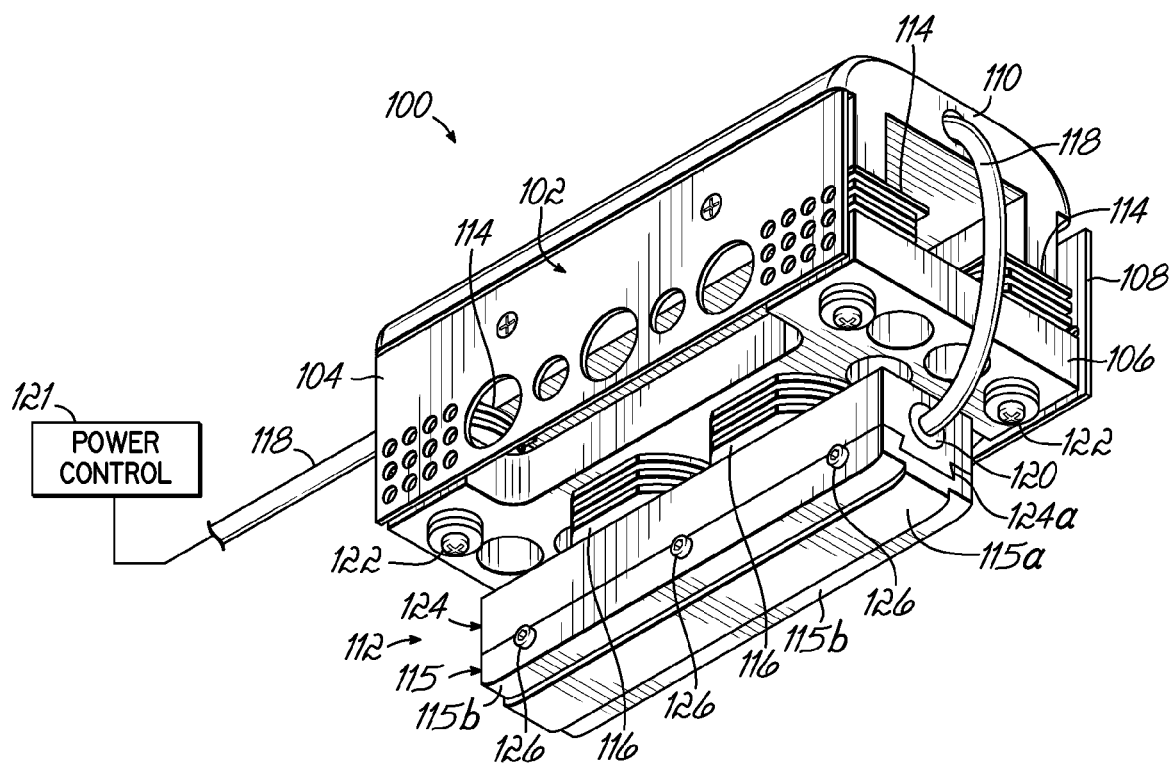
FIG. 9 is a perspective view of an alternative embodiment of a heated compression device or tool for applying heat and compression to the spacer.

FIG. 9 illustrates an alternative embodiment of a tool or heated compression device 100. In this embodiment, the device 100 comprises a support structure 102 formed of, for example, suitable plates 104, 106, 108 fastened together as shown. The device 100 further includes a handle 110, which may be formed from a heat insulative material, such as wood, thermally isolated from an elongate heated bar element 112. Thermal isolation may be effected, at least in part, through the use of finned elements 114 respectively secured between the handle 110 and the central plate 106 as well as additional finned elements 116 between the central plate 106 and the heated bar element 112. An electrical power cord 118 extends through the handle 110 and into the heated bar element 112 where it couples to an electrically operable heater such as an electrical resistive-type cartridge heater 120. A conventional control 121, such as a rheostat may be used to control the voltage supplied, and the temperature of the heater 120. Fasteners 122 may be used to secure the handle 110 to the respective finned elements 114 and the central plate 106. Additional fasteners (not shown) are used to secure the elongate heated bar element 112 to the respective finned elements 116 and the central plate 106.

Figure 10:
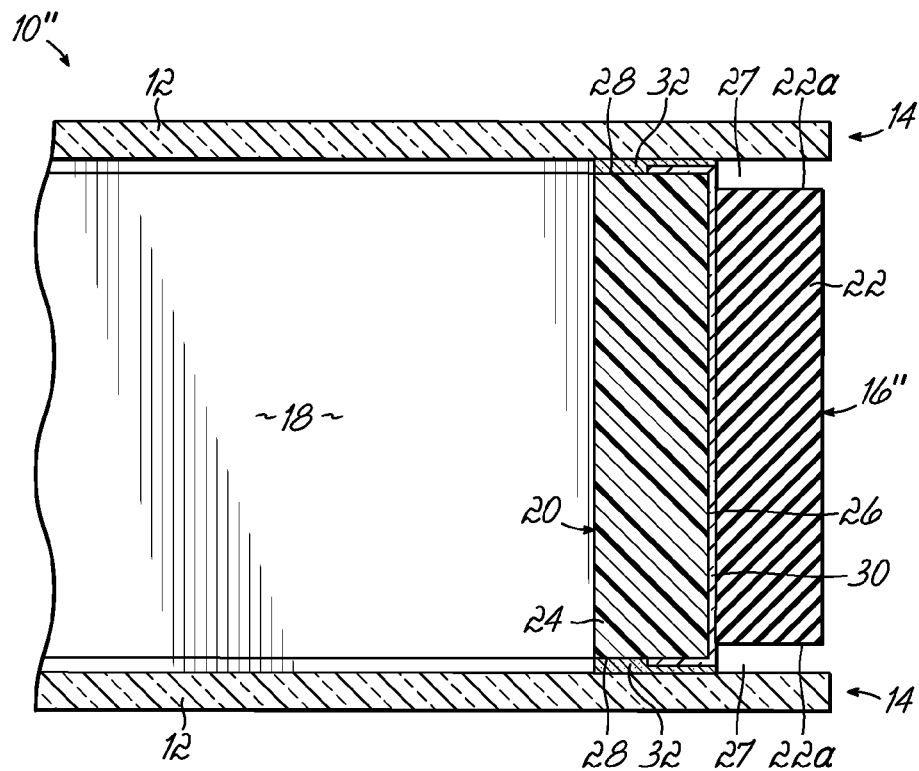
FIG. 10 is a cross sectional view similar to FIG. 2, but illustrating an alternative embodiment of the spacer which does not include the release substrate.

FIG. 10 illustrates a cross sectional view of a spacer 16" similar to FIG. 2, but eliminating the release substrate. Like reference numerals in FIGS. 2 and 10 illustrate like elements and therefore no additional discussion is necessary beyond the discussion contained below. It has been found that with a hot melt butyl adhesive 22 and the device 100 shown in FIG. 9, no release substrate 34 (FIG. 2) is necessary. When the device or tool 100 is used to heat, soften and compress (i.e., spread out) the butyl adhesive layer 22 any slight sticking that occurs is tolerable and residual butyl adhesive on the bar element 112 vaporizes under the high heat conditions. This is especially true when the bar element 112 is at a temperature above 500° F. As further shown in FIGS. 11 and 12, the heated bar element 112 is engaged with the butyl adhesive layer 22 such that a raised or projecting central portion 115a of a replaceable component 115 (FIG. 9) directly contacts the outer surface of the butyl adhesive 22. The bar element 112 may be heated at highly elevated temperatures above 350° F. and, preferably, above 500° F. The tool 100 is moved across the periphery of the panel assembly 10" as previously described with respect to the roller device 36. The speed at which the bar element 112 is slid across the surface of the adhesive 22 is such that the adhesive softens and even partially liquefies as it is compressed and spread outwardly as shown in FIG. 12 to directly contact inner surfaces of the respective, spaced apart panels 12. As the bar element 112 is slid along the edges of the panels 12 the recessed portions 115b of the replaceable component 115 preferably engage the peripheral edges of the panels 12 as shown in FIG. 12. Temperatures of higher than 1000° F. may be used when the operator slides the tool 100 along the peripheral of the panel assembly 10" at a higher rate of speed so as to not burn or char the adhesive 22. As better shown in FIGS. 11 and 12, the tool 100 preferably comprises the mentioned removable sealing material engagement component 115 and a base component 124. The sealing material engagement component 115 is releasably attached to the base component 124 using threaded fasteners 126 secured against a projecting dovetail portion 124a of the base component 124. When the fasteners 126 are threaded inwardly against the dovetail projection 124a this will force the sealing material engagement component 115 into firm and secure thermal contact with the base component 124. Both the sealing material engagement component 115 and the base component 124 are preferably formed from a heat conductive metal such as brass, or any similar heat conductive material capable of being sufficiently heated by the heater 120 (FIG. 9) such that heat may be transferred to the sealing material 22 to effect the functions described herein.

Figure 13:
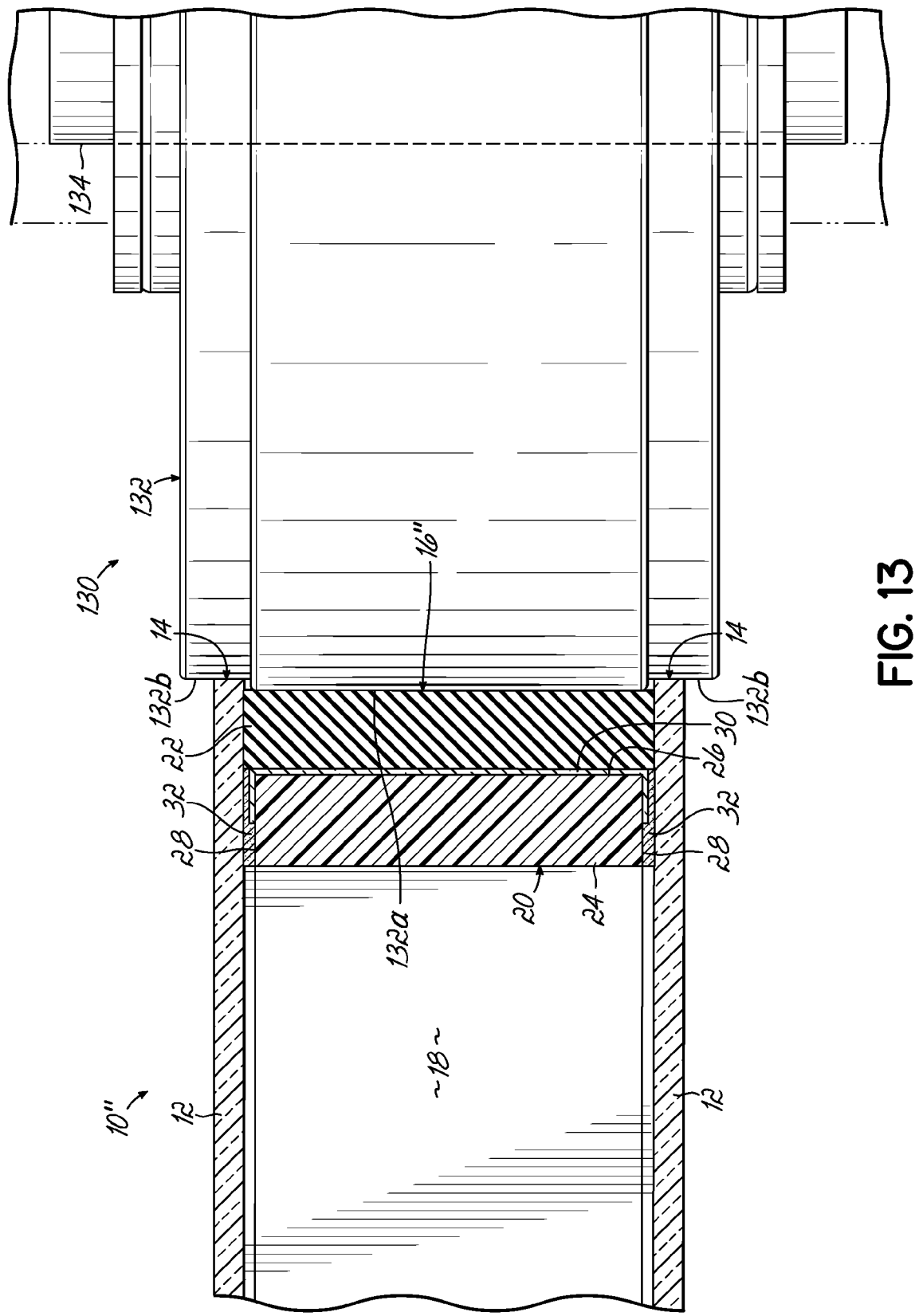
FIG. 13 is a cross sectional, partially fragmented view similar to FIG. 12, but illustrating an alternative heated compression device combining the roller feature of the first embodiment of the tool with the stepped working surface feature of the second embodiment of the tool.

FIG. 13 illustrates an alternative embodiment of a heated compression tool 130 being used on a panel assembly 10" as configured and shown in FIG. 10. Essentially, the elongate bar element 112 shown in FIGS. 9, 11 and 12 has been modified into a roller 132 such that the sealing material engagement component 115 has been formed into a cylindrical element mounted on a suitable rotating shaft 134. This embodiment would operate in the same manner as described in FIGS. 11 and 12 except that the heated roller element 132 would roll along the sealing material 22 as opposed to sliding along the material as described in connection with FIGS. 11 and 12. A central projecting portion 132a directly engages the seal material 22 while recessed portions 132b ride along edges of the panels 12. The seal material 22 is heated, softened and compressed/spread outwardly to seal against the panels 12 as shown in FIG. 13.

Figure 14A:
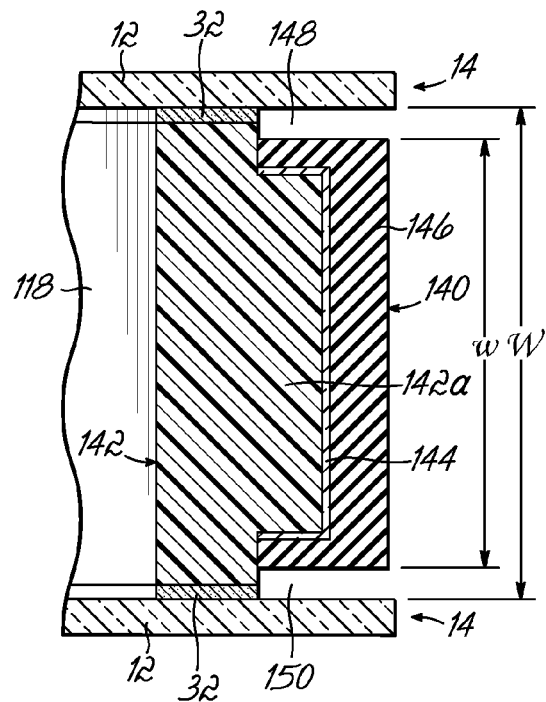
FIGS. 14A and 14B illustrate respective cross sectional views of an alternative spacer before and after heat and compression have been applied to the thermo-responsive sealing material.
Figure 14B:
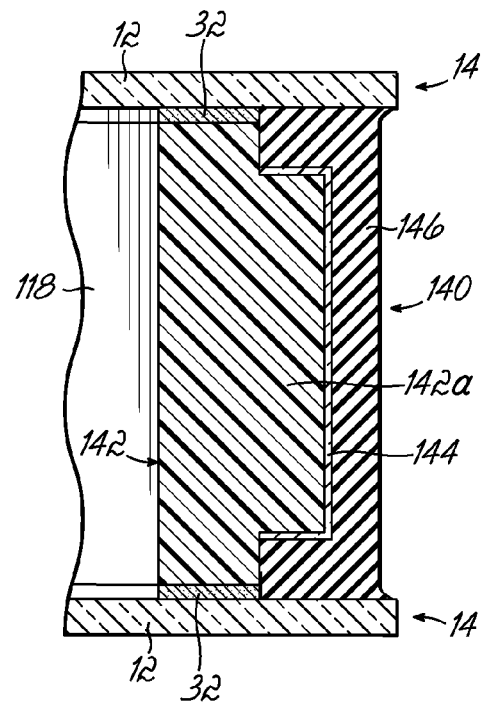

FIGS. 14A and 14B illustrate another embodiment of a spacer 140 including a raised central portion 142a of a foam, desiccant containing barrier 142 which is surrounded on its three sides by an optional moisture barrier 144 and a thermo-responsive sealing material 146. When the tool 100 or 130, for example, as shown in FIG. 9 or FIG. 13, is used to heat, softened and compress the thermo-responsive sealing material 146, the material 146 spreads into the respective recesses or spaces 148, 150 adjacent each panel 12 to fill those spaces 148, 150 and seal against the inner surface of each panel 12 as shown in FIG. 14B. It will be appreciated, again, that like reference numerals in the various drawings refer to like structure and associated description. Also, the foam barrier, moisture barrier layer and thermo-responsive sealing material described in connection with FIGS. 14A and 14B, as well as the remaining figures, may be of the types previously described.

FIGS. 15A and 15B illustrate another embodiment of a spacer 160 including a barrier 142 with the raised central portion 142a as described with respect to FIGS. 14A and 14B, but including two separate areas of thermo-responsive sealing material 162, 164 positioned adjacent opposite sides of the raised central portion 142a in the recesses 148, 150 as shown. The heated bar element 112' as previously described has also been modified to include two projecting portions 166, 168 on a replaceable component 115'. The projecting portions 166, 168 are engageable with the sealing material 162, 164 to heat, soften, compress and spread the sealing material 162, 164 into the recesses 148, 150 and against the inner surfaces of the panels 12 as the heated bar element 112' is moved along the peripheral edges of the panels 12 as previously described. The result is a configuration of the sealing material 162, 164 as generally shown in FIG. 15B in sealing engagement with the inner surfaces of the panels 12. This embodiment also shows the use of a moisture barrier 144. In embodiments of spacers that do not have full width coverage of a thermo-responsive sealing material such as a hot melt butyl adhesive, the use of a moisture barrier typically will be necessary for reasons previously discussed.

Figure 16A:
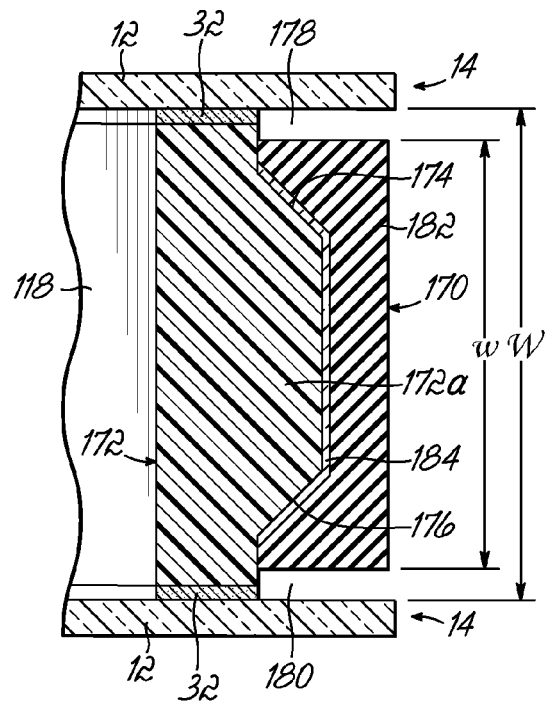
FIGS. 16A and 16B illustrate respective cross sectional views of an alternative spacer before and after heat and compression have been applied to the thermo-responsive sealing material.
Figure 16B:
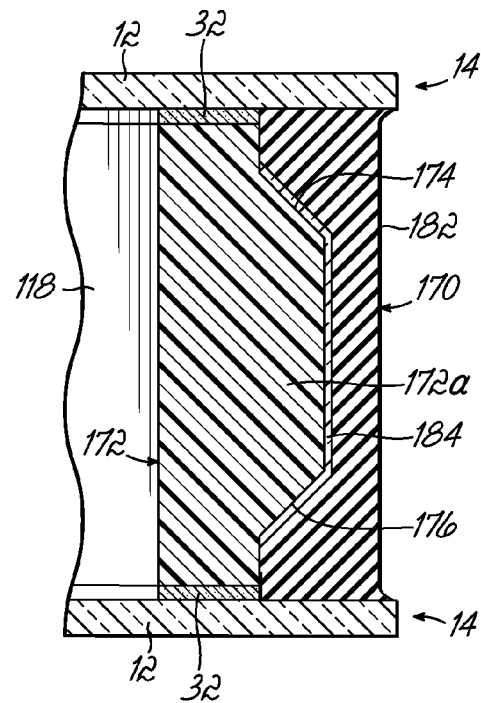

FIGS. 16A and 16B illustrate a spacer construction similar to the construction shown in FIGS. 14A and 14B. In this regard, this alternative spacer 170 includes a barrier 172 with a raised central portion 172a and with angled surfaces 174, 176 on opposite sides to create respective recesses 178, 180 containing sealing material 182 adjacent each panel 12. A moisture barrier layer 184 is positioned between barrier 172 and sealing material 182. When heat and compression is applied in one of the manners previously described, the thermo-responsive sealing material 182 is softened, with or without partial liquefication, so as to spread into the respective recesses or voids 178, 180 that initially exist directly adjacent the panels 12 as shown in FIG. 16A to then form a sealed condition as shown in FIG. 16B.

Figure 17A:
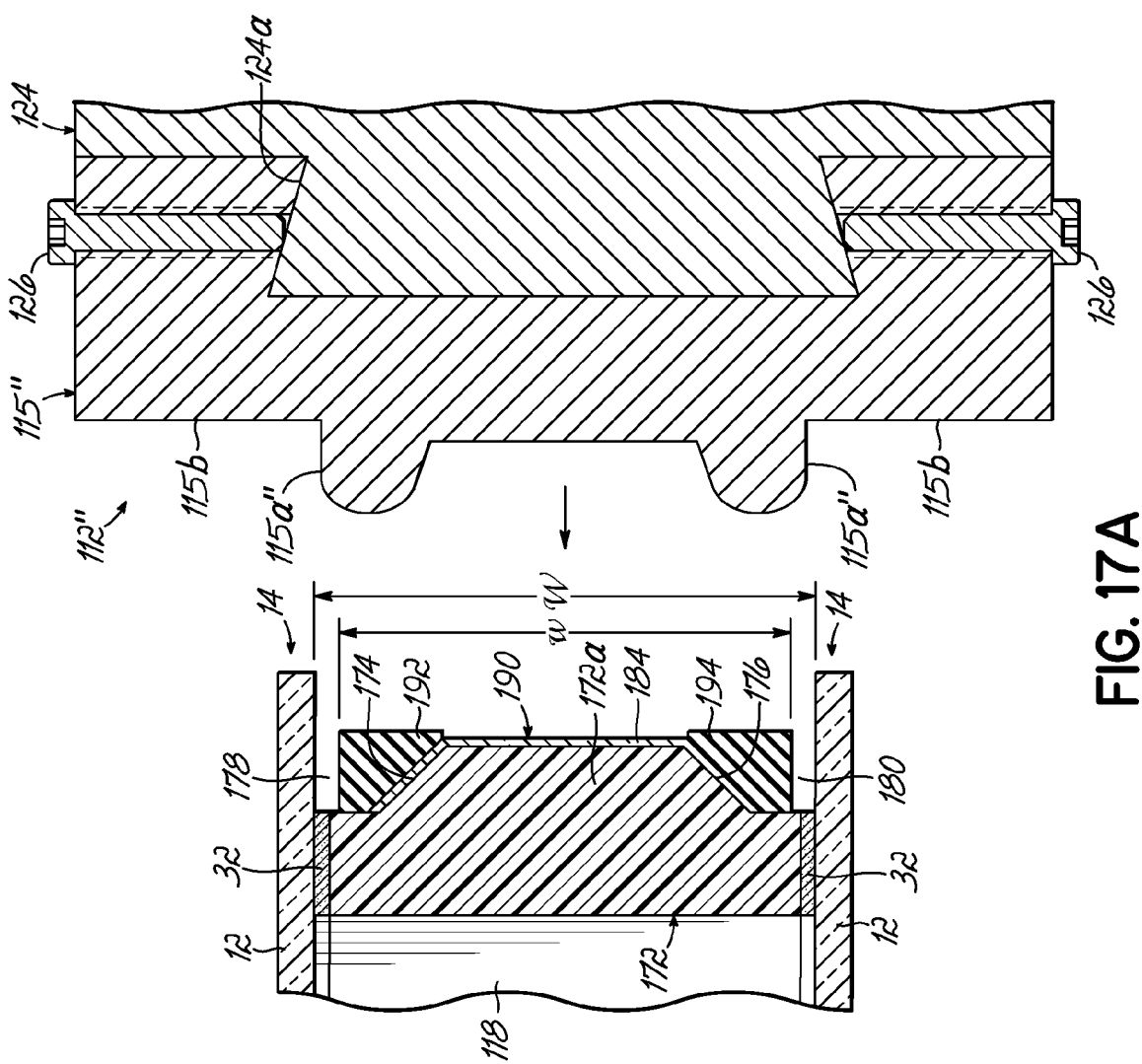
FIG. 17A is a cross sectional, partially fragmented view of another alternative embodiment of a heated compression tool just prior to its use on another alternative spacer.
Figure 17B:
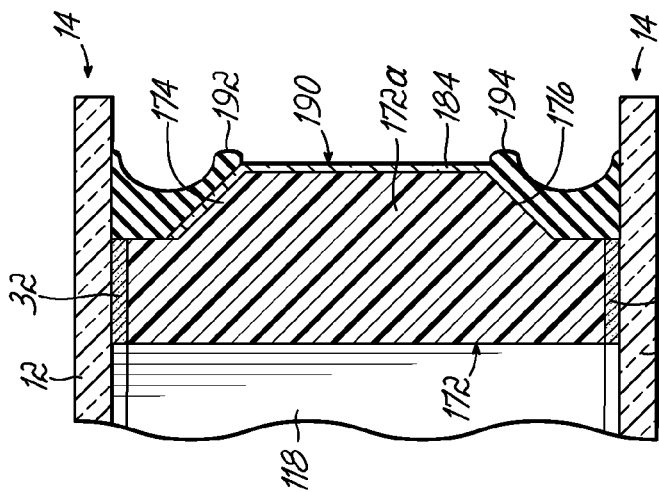
FIG. 17B is a cross sectional view of the translucent panel assembly after the spacer of FIG. 17A has been sealed using the tool shown in FIG. 17A.

FIGS. 17A and 17B illustrate another alternative embodiment of a heated bar element 112" and a spacer 190 combining aspects as shown in FIGS. 15A, 15B, 16A and 16B. In this embodiment, the bar element 112" again includes a replaceable component 115" with two spaced apart projecting portions 115a" which engage the respective areas of sealing material 192, 194 and thereby form the sealing configuration after heat and compression are applied, as shown in FIG. 17B. As further shown in the embodiments of FIGS. 14A, 16A and 17A, width w is not only less than width W, but is also less than the widths of the respective barrier layers 142, 172.

While the present invention has been illustrated by a description of various preferred embodiments and while these embodiments have been described in some detail, it is not the intention of the Applicants to restrict or in any way limit the scope of the appended claims to such detail. Additional advantages and modifications will readily appear to those skilled in the art. The various features of the invention may be used alone or in any combination depending on the needs and preferences of the user. This has been a description of the present invention, along with the preferred methods of practicing the present invention as currently known. However, the invention itself should only be defined by the appended claims.

What is claimed is:

1. A spacer for attaching first and second translucent panels together to form an insulating translucent panel assembly with a sealed space between the translucent panels, the spacer comprising:
    a barrier layer adapted to dry the sealed space between the translucent panels, said barrier layer including a desiccant-filled foam material including peripheral and side surfaces;
    a thermo-responsive sealing material co-molded with said barrier layer, said thermo-responsive sealing material capable of being softened to seal said barrier layer to the translucent panels when heat and compression are applied to the thermo-responsive sealing material; and
    a moisture barrier attached to said peripheral and side surfaces, between said desiccant-filled foam material and said thermo-responsive sealing material;
    wherein said barrier layer and said thermo-responsive sealing material each have a width adapted to extend between the panels, and the width of said thermo-responsive sealing material extends across a majority of the width of said barrier layer but is less than the width of said barrier layer.

2. A spacer for attaching first and second translucent panels together to form an insulating translucent panel assembly with a sealed space between the translucent panels, the spacer comprising:
    a barrier layer adapted to dry the sealed space between the translucent panels;
    a thermo-responsive sealing material co-molded with said barrier layer, said thermo-responsive sealing material capable of being softened to seal said barrier layer to the translucent panels when heat and compression are applied to the thermo-responsive sealing material; and
    a pressure-sensitive adhesive applied to opposite side surfaces of said barrier layer and adapted to attach the translucent panels to the spacer;
    wherein said barrier layer and said thermo-responsive sealing material each have a width adapted to extend between the panels, and the width of said thermo-responsive sealing material extends across a majority of the width of said barrier layer but is less than the width of said barrier layer.

3. A spacer for attaching first and second translucent panels together to form an insulating translucent panel assembly with a sealed space between the translucent panels, the spacer comprising:
    a barrier layer adapted to dry the sealed space between the translucent panels;
    a thermo-responsive sealing material co-molded with said barrier layer, said thermo-responsive sealing material capable of being softened to seal said barrier layer to the translucent panels when heat and compression are applied to the thermo-responsive sealing material; and
    a release substrate applied to said thermo-responsive sealing material;
    wherein said barrier layer and said thermo-responsive sealing material each have a width adapted to extend between the panels, and the width of said thermo-responsive sealing material extends across a majority of the width of said barrier layer but is less than the width of said barrier layer.

4. The spacer of claim 1, wherein said thermo-responsive sealing material is an adhesive.

5. The spacer of claim 4, wherein said adhesive further comprises a hot melt adhesive.

6. The spacer of claim 1, wherein said thermo-responsive sealing material is co-extruded with said barrier layer.

7. A spacer for attaching first and second translucent panels together to form an insulating translucent panel assembly with a sealed space between the translucent panels, the spacer comprising:
    a barrier layer adapted to dry the sealed space between the translucent panels;
    a thermo-responsive sealing material co-molded with said barrier layer, said thermo-responsive sealing material capable of being softened to seal said barrier layer to the translucent panels when heat and compression are applied to the thermo-responsive sealing material; and an adhesive applied to opposite side surfaces of said barrier layer and adapted to attach the translucent panels to the spacer, wherein said barrier layer and said adhesive define a combined first width adapted to extend between the panels and said thermo-responsive sealing material defines a second width adapted to extend between the panels, and the second width extends across a majority of the combined first width but is less than the combined first width.

8. A spacer for attaching first and second translucent panels together to form an insulating translucent panel assembly with a sealed space between the translucent panels, the spacer comprising:

a barrier layer adapted to dry the sealed space between the translucent panels, said barrier layer including a desiccant-filled foam material including peripheral and side surfaces;

a thermo-responsive sealing material co-molded with said barrier layer, said thermo-responsive sealing material arranged to be spaced from each panel and capable of being softened to seal said barrier layer to the translucent panels when heat and compression are applied to the thermo-responsive sealing material; and a moisture barrier attached to said peripheral and side surfaces, between said desiccant-filled foam material and said thermo-responsive sealing material;

wherein said barrier layer and said thermo-responsive sealing material each have a width adapted to extend between the panels, and the width of said thermo-responsive sealing material is less than the width of said barrier layer.

9. A spacer for attaching first and second translucent panels together to form an insulating translucent panel assembly with a sealed space between the translucent panels, the spacer comprising:

a barrier layer adapted to dry the sealed space between the translucent panels;

a thermo-responsive sealing material co-molded with said barrier layer, said thermo-responsive sealing material arranged to be spaced from each panel and capable of being softened to seal said barrier layer to the translucent panels when heat and compression are applied to the thermo-responsive sealing material; and a pressure-sensitive adhesive applied to opposite side surfaces of said barrier layer and adapted to attach the translucent panels to the spacer;

wherein said barrier layer and said thermo-responsive sealing material each have a width adapted to extend between the panels, and the width of said thermo-responsive sealing material is less than the width of said barrier layer.

10. A spacer for attaching first and second translucent panels together to form an insulating translucent panel assembly with a sealed space between the translucent panels, the spacer comprising:

a barrier layer adapted to dry the sealed space between the translucent panels;

a thermo-responsive sealing material co-molded with said barrier layer, said thermo-responsive sealing material arranged to be spaced from each panel and capable of being softened to seal said barrier layer to the translucent panels when heat and compression are applied to the thermo-responsive sealing material; and a release substrate applied to said thermo-responsive sealing material;

wherein said barrier layer and said thermo-responsive sealing material each have a width adapted to extend between the panels, and the width of said thermo-responsive sealing material is less than the width of said barrier layer.

11. The spacer of claim 8, wherein said thermo-responsive sealing material is an adhesive.

12. The spacer of claim 11, wherein said adhesive further comprises a hot melt adhesive.

13. The spacer of claim 8, wherein said thermo-responsive sealing material is co-extruded with said barrier layer.

14. A spacer for attaching first and second translucent panels together to form an insulating translucent panel assembly with a sealed space between the translucent panels, the spacer comprising:

a barrier layer adapted to dry the sealed space between the translucent panels;

a thermo-responsive sealing material co-molded with said barrier layer, said thermo-responsive sealing material arranged to be spaced from each panel and capable of being softened to seal said barrier layer to the translucent panels when heat and compression are applied to the thermo-responsive sealing material; and an adhesive applied to opposite side surfaces of said barrier layer and adapted to attach the translucent panels to the spacer, wherein said barrier layer and said adhesive define a combined first width adapted to extend between the panels and said thermo-responsive sealing material defines a second width adapted to extend between the panels, and the second width is less than the combined first width.

\* \* \* \* \*